(12) United States Patent
Smith

(10) Patent No.: US 6,239,721 B1
(45) Date of Patent: May 29, 2001

(54) BOOTSTRAPPED LOCATION DETERMINATION

(75) Inventor: Derek Steve Smith, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/178,048

(22) Filed: Oct. 26, 1998

(51) Int. Cl.⁷ .................................... H04Q 1/00
(52) U.S. Cl. ................. 340/825.49; 342/357.16
(58) Field of Search .............. 342/357, 357.14, 342/357.06, 457; 340/826.49, 988

(56) References Cited

U.S. PATENT DOCUMENTS

| | | | |
|---|---|---|---|
| 4,983,980 | 1/1991 | Ando | 342/357 |
| 5,059,969 | 10/1991 | Sakaguchi et al. | 342/352 |
| 5,072,227 * | 12/1991 | Hatch | 342/527 |
| 5,177,490 | 1/1993 | Ando et al. | 342/357 |
| 5,276,972 | 1/1994 | Staney | 33/271 |
| 5,309,162 | 5/1994 | Uematsu et al. | 342/372 |
| 5,712,899 * | 1/1998 | Pace, II | 379/58 |
| 5,757,315 | 5/1998 | Aoki | 342/357 |

* cited by examiner

Primary Examiner—Brian Zimmerman
(74) Attorney, Agent, or Firm—John F. Schipper

(57) ABSTRACT

A system for determining the location of a moving signal-receiving station, when the primary location determination (LD) signals become unavailable because the antenna is adjacent to or within a signal-interfering structure, such as an urban canyon, a natural canyon, a forest or the like. Before the primary LD signals become unavailable, secondary LD signals are received at spaced apart locations and used to estimate the secondary LD signal source locations (preferably fixed). After the primary LD signals become unavailable, secondary LD signals, now with known source locations, are received and used, either alone or in combination with the remaining primary LD signals, if any, to determine the present location of the moving station. The primary LD signal sources can be GPS or GLONASS or LEO or other satellite-based sources. The secondary LD signal sources can be pseudolites or Loran signal towers or other ground-based sources.

12 Claims, 3 Drawing Sheets

BOOTSTRAPPED LOCATION DETERMINATION

FIELD OF THE INVENTION

This invention relates to determination of location of a moving signal receiver and of associated signal sources.

BACKGROUND OF THE INVENTION

Use of location satellite-based location determination (LD) systems, such as the Global Positioning System (GPS), the Global Orbiting Navigational Satellite System (GLONASS) or a Low Earth Orbit (LEO) system, such as Iridium or Globalstar, to determine the location of a mobile LD station may become (temporarily) unavailable when the LD station is adjacent to or within a signal canyon, such as an urban canyon, a natural canyon (steep canyon walls, a deep open mining pit, an underground mine, etc.), a forest, inside a large warehouse, or a similar signal-interfering structure (referred to collectively here as a "canyon"). One response to such occurrence is to resort to dead reckoning, using an inertial guidance system, using accelerometers, magnetic field sensors and the like, whenever sufficient LD signals are unavailable. This method is suitable for time intervals of modest length, where the inaccuracy and drift of the sensors used are within tolerable limits.

However, for tracking of the location of a mobile LD station over longer time intervals, the dead reckoning approach may be unsuitable. What is needed is a system that uses receipt of primary LD signals, when such signals are still available, to determine the locations of one or more secondary LD signal sources that can subsequently be used to determine the mobile LD station location when the primary LD signals become unavailable. Preferably, this system should be flexible enough to work with all types of primary and secondary LD signal sources, including mixtures thereof, and should, in principle, allow for location determination anywhere within or adjacent to the canyon. Preferably, the system should be able to determine, without further human input, when sufficient primary LD signals are available and when sufficient primary LD signals are unavailable for location determination.

SUMMARY OF THE INVENTION

These needs are met by the invention, which provides a system and associated method for (1) receiving and analyzing primary LD signals at a mobile LD station to determine (i) the present location of the LD station and (ii) the location (relative or absolute) of each of one or more secondary LD signal sources whose signals are also received at the LD station, and (2) receiving and analyzing secondary LD signals, after the secondary LD signal source locations have been determined, when primary LD signals in sufficient numbers are no longer available. The method includes the steps of: (1) receiving primary LD signals from two or more primary LD signal sources, whose locations are accurately known, at a mobile LD station and determining a present location of the LD station at two or more distinct LD station locations, (2) receiving secondary LD signals from one or more (preferably two or more) secondary LD signal sources at each of the two or more distinct LD station locations and determining the locations of the secondary LD signal source(s) from the secondary signals received, and (3) when primary LD signals in sufficient numbers are unavailable, receiving secondary LD signals and using these signals and their now-known locations to determine a present location of the LD station.

DESCRIPTION OF BEST MODES OF THE INVENTION

Figure 1:
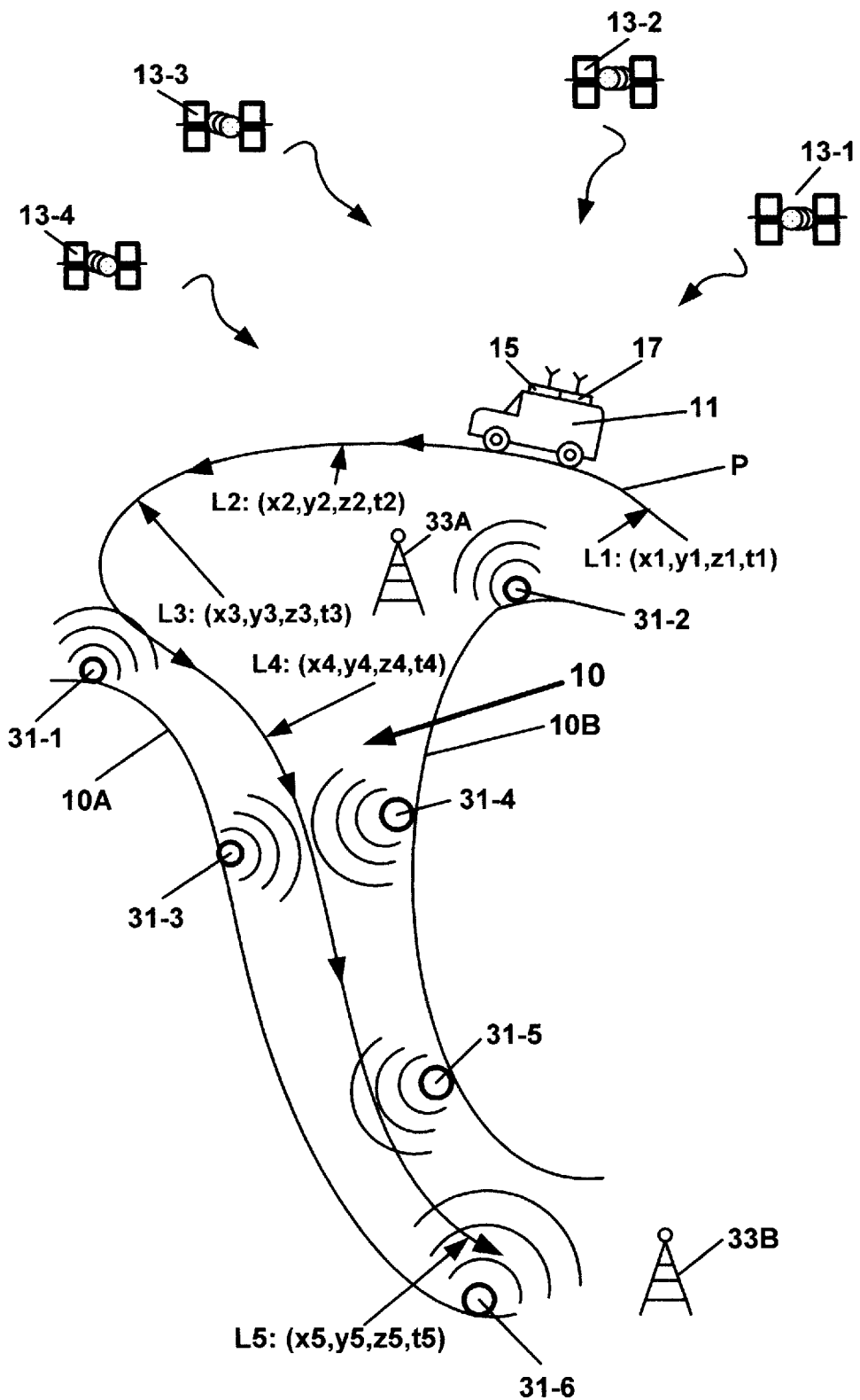
FIG. 1 illustrates an environment in which the invention can be used.

FIG. 1 illustrates a "canyon" 10, with defining canyon boundaries or walls 10A and 10B, in which the invention can be used. A mobile LD signal-receiving station 11, such as a moving vehicle, receives primary LD signals from two or more primary LD signal sources 13-$j$ ($j$=1, 2, 3, 4). The primary LD signals may be signals transmitted from two or more satellite-based location determination (LD) systems, such as the Global Positioning System (GPS), the Global Orbiting Navigational Satellite System (GLONASS) or a Low Earth Orbit (LEO) system, such as Iridium or Globalstar. Alternatively, the primary LD signals may be transmitted from two or more ground-based primary LD signal sources, such as GPS pseudolites, Loran signal towers or the like. The primary LD signals are received at a primary LD signal antenna/receiver 15 that is attached to, or otherwise carried by, the mobile LD station 11 and are used to determine a present location of the LD station at two or more spaced apart locations, such as $L_i:(x_i,y_i,z_i,t_i)$ ($i$=1, 2, 3), where (x,y,z) are spatial location fix coordinates and t is a temporal location fix coordinate. As few as two of the four location fix coordinates (x,y,z,t) may need to be determined in order to fix a present location of the mobile LD station 11.

Secondary LD signals are transmitted, preferably on a known time schedule at one or more of a sequence of times $\{t=t'_{k,n}\}_n$, by each of one or more secondary LD signal sources 31-$k$ ($k$=1, 2, 3, 4) and are received by a secondary antenna/receiver combination 17 on the mobile LD station 11 at the locations $L_i:(x_i,y_i,z_i,t_i)$ ($i$=1, 2, 3, 4). The locations of the secondary LD signal sources need not be known initially. Preferably, a signal transmitted by each secondary LD signal source has a unique indicium, such as its carrier frequency or an associated CDMA code, that allows identification of this secondary LD signal and distinction of this received signal from a signal transmitted by any other secondary LD signal source. The secondary antenna/receiver combination 17 receives one or more (preferably two or more) secondary LD signals and estimates or determines a distance $\Delta d'_{ik}$ from the identifiable secondary LD signal source 31-$k$ to the present, known location $L_i:(x_i,y_i,z_i,t_i)$ of the LD station 11, using an equation such as $$\Delta d'_{ik} = c'(t_i - t'_k) \qquad (1)$$
$$= \{(x_i - x'_k)^2 + (y_i - y'_k)^2 + (z_i - z'_k)^2\}^{1/2}.$$

Here c' is a representative velocity of propagation of an electromagnetic signal in the ambient medium of FIG. 1 and the unknowns are the location coordinates $(x'_k,y'_k,z'_k)$ of the secondary LD signal source 31-$k$. The distance $\Delta d'_{ik}$ between the secondary LD signal source 31-$k$ and the location $L_i:(x_i,y_i,z_i,t_i)$ is estimated or determined by this difference in time, as indicated. Receipt of these signals from one secondary LD signal source at two or more spaced apart locations $L_i:(x_i,y_i,z_i,t_i)$ is used to estimate or determine, by triangulation or otherwise, the incremental location coordinates $\Delta L'_k:(x'_k,y'_k,z'_k,t_i)$ of each of two or more visible secondary LD signal sources 31-k (k=1, 2, 3, 4) relative to these locations $L_i:(x_i,y_i,z_i,t_i)$.

Alternatively, the primary LD signal antenna/receiver 15 receives one or more primary LD signals from the primary LD signal sources 13-j, and the secondary LD signal antenna/receiver 17 receives one or more secondary LD signals from the secondary LD signal sources 31-k, and these received LD signals are used together to determine or estimate the present location of the mobile LD station 11. This situation might occur, for example, when primary LD signals are received in fewer numbers than the minimum required to adequately determine the present location of the mobile station 11: one or more additional (timed) secondary LD signals are used to supplement the information obtained from the primary LD signals received at the mobile station 11.

Using the known absolute location coordinates $(x_i,y_i,z_i)$ of the LD station 11 at the time $t_i$ (i=1, 2, 3, 4) and the locations of the secondary LD signal sources determined at these times, the absolute locations of the secondary LD signal sources 31-k are determined and stored:

$$L'_k:(x'_k,y'_k,z'_k)=L_i:(x_i,y_i,z_i;t_i)+\Delta L'_k:(x'_k,y'_k,z'_k,t_i). \quad (2)$$

The secondary antenna/receiver 17 continually receives the secondary LD signals from the secondary LD signal sources that are visible from its present location along the path P.

As the mobile LD station 11 moves along its path P, the LD station may enter or pass adjacent to a canyon 10 and thereby lose enough primary LD signals that the station cannot determine its present location, using only the primary LD signals received. When this situation occurs, the system senses that insufficient primary LD signals are available and switches to use of the received secondary LD signals, either as a supplement or exclusively, where the locations $L'_k:(x'_k, y'_k,z'_k)$ of the sources of these secondary LD signals are now known. The LD station 11 continues along its path P and continues to determine its present location through receipt of the secondary LD signals, possibly supplemented by receipt of one or more primary LD signals.

As the mobile LD station moves through a canyon 10, the LD station may lose sight of one or more of the original secondary LD signals on which the LD station relied when the primary LD signals first became unavailable. However, if additional secondary LD signal sources, such as 31-5 and 31-6, are positioned at appropriate locations within the canyon 10, the secondary antenna/receiver 17 receives secondary LD signals from these new secondary LD signal sources at two or more spaced apart locations and determines the locations of these new sources as before, using the mobile LD station's present knowledge of its own location. Proceeding in this manner, the mobile LD station 11 can "bootstrap" itself to determine its present location by: (1) using the initially received primary LD signals to determine its present location; (2) using its present knowledge of its own location and receipt of one or more initial secondary LD signals to determine the locations of the visible secondary LD signal sources; (3) using receipt of the initial secondary LD signals and knowledge of their source locations to continue to determine the station present location, when sufficient primary LD signals are no longer available; (4) receiving secondary LD signals from one or more additional sources (not visible initially) and determining the locations of these additional secondary LD signal sources (optional); and (5) receiving secondary LD signals from a mixture of initial secondary LD signal sources and the additional secondary LD signal sources and continuing to determine the present location of the station (optional).

Figure 2:
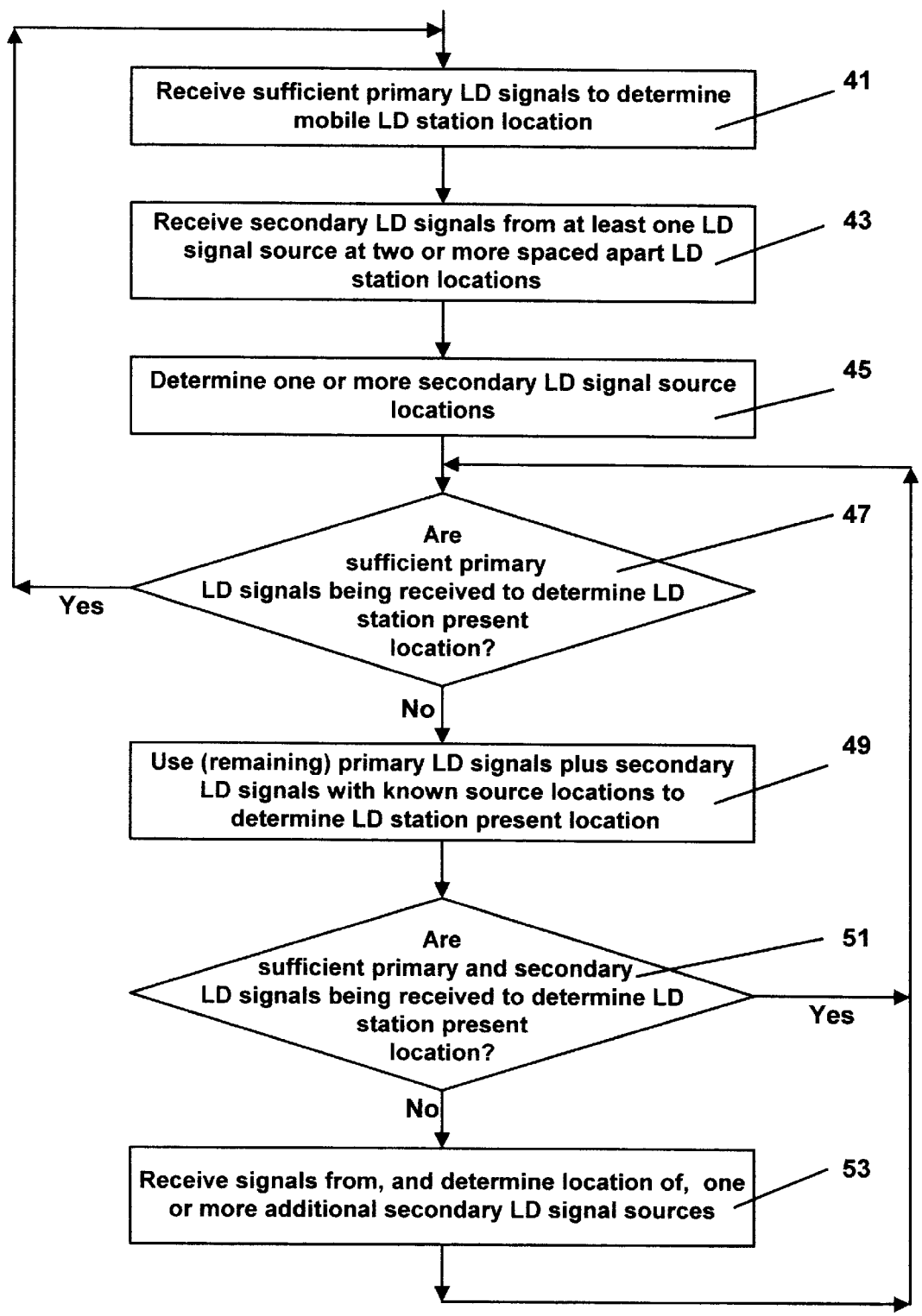
FIG. 2 is a flow chart of a procedure illustrating practice of the invention.

FIG. 2 is a flow chart illustrating this procedure in one embodiment. In step 41, the system receives primary LD signals in sufficient number to determine the present location of the mobile LD station. In steps 43 and 45, the system receives secondary LD signals from two or more secondary LD signal sources, at each of two or more spaced apart LD station locations, and determines or estimates the locations of the secondary LD signal sources.

In step 47, the system determines if primary LD signals are being received in sufficient number to determine or estimate the LD station location? If the answer to the question in step 47 is "yes," the system recycles to step 61 and continues. If the answer to the question in step 47 is "no," the system moves to step 49 and uses the available primary and secondary LD signals now being received to determine or estimate the LD station present location. This may include (i) only secondary LD signals or (ii) one or more LD signals plus one or more secondary LD signals.

In step 51, the system determines (i) if secondary LD signals are being received in sufficuent number, or (ii) if primary plus secondary LD signals are being received in sufficient number, to determine or estimate the LD station location? If the answer to the question in step 51 is "yes,", the system recycles to step 47. If the answer to the question in step 51 is "no," the system moves to step 53 and receives, or attempts to receive, secondary LD signals from one or more additional secondary LD signal sources, in order to be able to determine or estimate the LD station present location from the secondary LD signals alone. The system then recycles to step 47.

Figure 3:
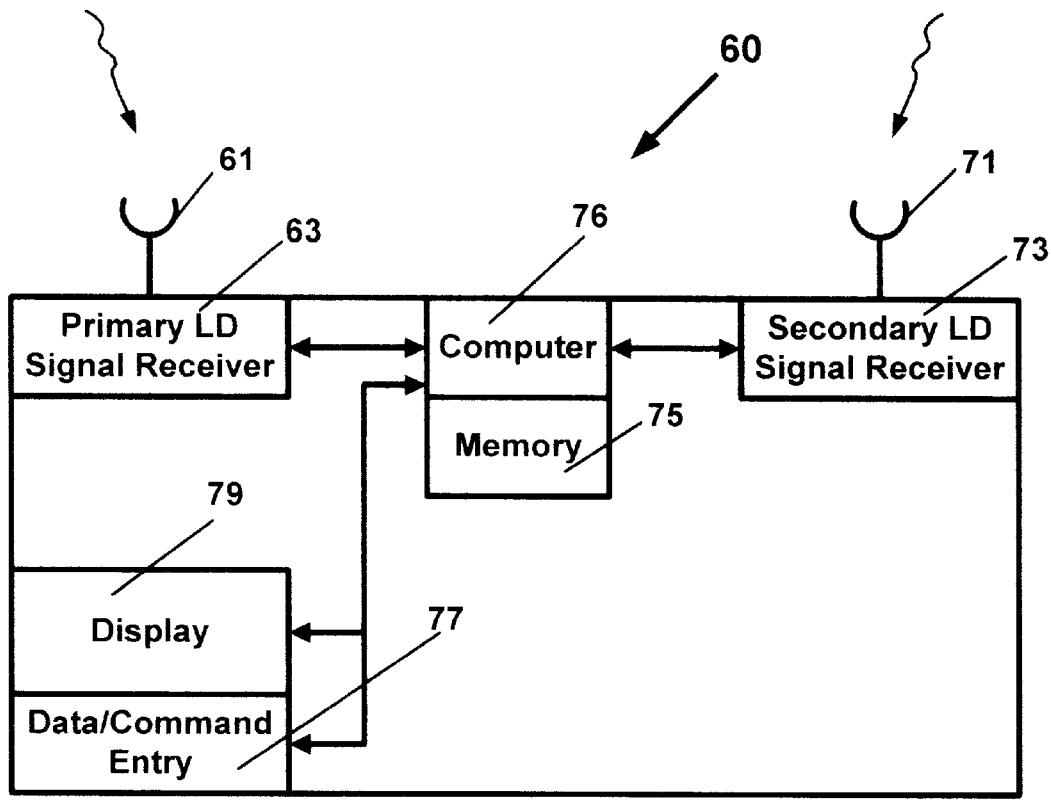
FIG. 3 is a schematic view of suitable apparatus for practicing the invention.

FIG. 3 illustrates schematically apparatus 60 that is suitable for practicing the invention. Primary LD signals are received at a primary LD signal antenna 61 and passed to a primary LD signal receiver (and signal processor) 63 for analysis. The primary receiver 63 acquires and locks onto the incident primary LD signals and initially determines if these signals are being received in sufficient number, and at sufficient signal strength and signal definition, to allow determination of the location of the primary antenna 61 using only the primary LD signals.

When sufficient primary LD signals are available, the primary receiver 63 determines the present location of the primary antenna 61. A secondary LD signal antenna 71 receives secondary LD signals from another group of LD signal sources (optionally local) and passes these signals to a secondary signal receiver (and signal processor) 73. The secondary receiver 73 receives and identifies the secondary LD signals received from each of one or more secondary LD signal sources at two or more spaced apart secondary antenna locations and determines or estimates the locations of each of these visible secondary LD signal sources and stores this information in the memory 75 of an associated computer 76. Optionally, the memory 75 also receives and stores a sequence of present locations of the primary antenna 61 and/or the secondary antenna 71. Preferably, the primary antenna 61 and the secondary antenna 71 are located close to each other. Optionally, these two antennas can be combined. Optionally, the primary receiver 63 and the secondary receiver 73 can be combined, using one computer to process the received signal data.

When sufficient primary LD signals are not available, the secondary antenna 71 and secondary receiver 73 continue to receive signals from the secondary LD signal sources (whose locations are now known) and use receipt of the secondary LD signals to determine the present location of the secondary antenna 71. Optionally, the apparatus 60 also includes a data/command entry mechanism 77, such as a keyboard, and a visual or audible display 79 that provides information on the present location of the primary antenna 61 and/or the secondary antenna 71.

Where one or more primary LD signals are available, but in insufficient number to allow determination of the present location of the mobile LD station 11, primary and secondary LD signals can be used together to determine the LD station location. In this approach, ranges or pseudoranges from at least one primary LD signal and from at least one secondary LD signal are measured and used for location estimation.

Returning to FIG. 1, the secondary LD signal sources 31-$k$ (k=1, 2, 3, 4, 5) may be provided with a time synchronization signal by a timing signal source 33A and/or 33B, with known location(s), which transmits a timing synchronization signal, such as a recognizable pulse, periodically, preferably at time intervals in the range 0.1–5 sec. The location of a timing signal source 33A and/or 33B is chosen to allow all the secondary LD signal sources 31-$k$ to receive the timing signal and to approximately synchronize transmission of their own secondary LD signals using the timing signal(s). This may require provision of more than one strategically placed timing signal source 33A and 33B, and a plurality of timing signal sources should be synchronized with each other.

If the location of each secondary LD signal source 31-$k$ is not initially known, the distance of each such source from the timing signal source must also be estimated. This can be done by the following procedure. Each secondary LD signal source transmits an interrogation signal, coded with a distinguishing indicium, such as a different carrier frequency or a different CDMA encoding scheme. Preferably, the interrogation signals are transmitted at spaced apart times by each secondary LD signal source so that interrogation signals from different secondary LD signal sources do not collide at the timing signal source 33A (or 33B). The timing signal source receives each interrogation signal from the source 31-$k$, analyzes the received signal to identify the interrogation signal source, and transmits an interrogation reply signal (also with a distinguishing indicium) after a known or selected time delay $\Delta t(k)$ for signal processing. The secondary LD signal source that transmitted the interrogation signal receives and identifies the interrogation reply signal at a measured time increment $\Delta t(total)$ after the interrogation signal was transmitted. This secondary LD signal source then determines its distance $\Delta d(\mathbf{31}\text{-}k,\mathbf{33A})$ from the timing signal source 33A, using the relation $$\Delta t(31\text{-}k,33A)=c'\{\Delta t(total)-\Delta t(k)\}/2. \quad (3)$$

Thereafter, the secondary LD signal source 31-$k$ adjusts its time of receipt of the timing signal from the timing signal source 33A by the fixed amount $\Delta t(\mathbf{31}\text{-}k,\mathbf{33A})$, in order to compensate for the distance of the source 31-$k$ from the timing signal source 33A. The processing time delays $\Delta t(k)$ may be uniform or may vary with the index k.

What is claimed is:

1. A method for determining the location of a moving signal receiver, the method comprising the steps of:
   receiving primary location determination (LD) signals from two or more primary LD signal sources, whose locations are known, at a primary LD signal antenna and associated signal receiver;
   when sufficient primary LD signals are available, estimating the present location of the primary antenna;
   receiving secondary location determination (LD) signals from one or more secondary LD signal sources, whose locations are not necessarily known, at a secondary LD signal antenna at each of two or more spaced apart locations and estimating the location of each of the at least one secondary LD signal sources, using knowledge of the present location of the primary antenna; and
   when sufficient primary LD signals are unavailable to determine location of the primary antenna, analyzing the primary LD signals received and the secondary LD signals received and estimating the present location of at least one of the primary antenna and the secondary antenna.

2. The method of claim 1, further comprising the step of providing each of said at least one secondary LD signals with a selected indicium that allows each of said at least one secondary LD signals to be identified.

3. The method of claim 2, further comprising the step of selecting said indicium from the group consisting of an FDMA indicium and a CDMA indicium.

4. The method of claim 1, further comprising the step of providing time synchronization for each of said secondary LD signal sources.

5. The method of claim 1, further comprising the step of providing and using said secondary LD signals from at least two of said secondary LD signal sources to estimate said present location of said secondary antenna.

6. The method of claim 1, further comprising the step of providing at least one of said primary LD signals from one or more satellite that are part of a satellite-based location determination system drawn from a group consisting of a Global Positioning System, a Global Orbiting Navigational Satellite System and a Low Earth Orbit system.

7. A system for determining the location of a moving signal receiver, the system comprising:
   a primary location determination (LD) signal antenna and receiver that receives primary LD signals from two or more primary LD signal sources, whose locations are known;
   a secondary LD signal antenna and receiver, positioned adjacent to the primary antenna, that receives secondary location determination (LD) signals from one or more secondary LD signal sources, whose locations are not necessarily known, at each of two or more spaced apart secondary antenna locations and estimates the distance between each secondary LD signal source location and the present location of the primary antenna; and
   a computer that is programmed:
      to estimate the location of each of the at least one secondary LD signal sources, using knowledge of the present location of the primary antenna;
      when sufficient primary LD signals are available, to estimate the present location of the primary antenna; and
      when sufficient primary LD signals are unavailable to determine location of the primary antenna, to analyze the primary LD signals and the secondary LD signals received and to estimate the present location of at least one of the primary antenna and the secondary antenna.

8. The system of claim 7, wherein each of said at least one secondary LD signals is provided with a selected indicium that allows each of said at least one secondary LD signals to be identified.

9. The system of claim 8, wherein said indicium is selected from the group consisting of an FDMA indicium and a CDMA indicium.

10. The system of claim 7, wherein said computer is further programmed to provide time synchronization for signals received at said secondary antenna.

11. The system of claim 7, wherein said secondary LD signals from at least two of said secondary LD signal sources are used to estimate said present location of said secondary antenna.

12. The system of claim 7, wherein said primary LD signals are provided by one or more satellites that are part of a satellite-based location determination system drawn from a group consisting of a Global Positioning System, a Global Orbiting Navigational Satellite System and a Low Earth Orbit system.

* * * * *